US006662452B2

(12) United States Patent
Whited

(10) Patent No.: US 6,662,452 B2
(45) Date of Patent: Dec. 16, 2003

(54) POWER OPERATED ROTARY KNIFE

(75) Inventor: Jeffrey A. Whited, Amherst, OH (US)

(73) Assignee: Bettcher Industries, Inc., Birmingham, OH (US)

( * ) Notice: Subject to any disclaimer, the term of this patent is extended or adjusted under 35 U.S.C. 154(b) by 10 days.

(21) Appl. No.: 10/128,001

(22) Filed: Apr. 22, 2002

(65) Prior Publication Data

US 2003/0196333 A1 Oct. 23, 2003

(51) Int. Cl.[7] .................................... A22C 17/04
(52) U.S. Cl. .................................... 30/276
(58) Field of Search .................... 30/276, 347, 329, 30/332; 452/133, 137

(56) References Cited

U.S. PATENT DOCUMENTS

| | | | | |
|---|---|---|---|---|
| 946,414 A | | 1/1910 | Wikander | |
| 1,943,960 A | | 1/1934 | Heumann | |
| 2,348,612 A | | 5/1944 | Deacon | |
| 2,699,756 A | | 1/1955 | Miller | |
| 2,743,707 A | | 5/1956 | Kellersman | |
| 2,758,372 A | | 8/1956 | Gammons | |
| 2,818,643 A | | 1/1958 | Dawson | |
| 2,939,213 A | | 6/1960 | Daniel | |
| 3,081,790 A | | 3/1963 | Radford | |
| 3,294,120 A | | 12/1966 | Ruchser | |
| 3,453,730 A | | 7/1969 | Schmidt | |
| 3,688,402 A | | 9/1972 | Shannon | |
| 3,787,742 A | | 1/1974 | Murphy | |
| 3,831,277 A | | 8/1974 | Nagata | |
| 3,834,020 A | | 9/1974 | Caire | |
| 3,970,110 A | | 7/1976 | Schaedler et al. | |
| 4,074,430 A | | 2/1978 | Sugiyama | |
| 4,109,381 A | | 8/1978 | Pellenc | |
| 4,198,750 A | * | 4/1980 | Bettcher | 30/276 |
| 4,206,603 A | | 6/1980 | Mekler | |
| 4,359,821 A | | 11/1982 | Pellenc | |
| 4,363,170 A | * | 12/1982 | McCullough | 30/276 |
| 4,382,331 A | | 5/1983 | Kimura | |
| 4,521,963 A | | 6/1985 | Lind et al. | |
| 4,575,938 A | * | 3/1986 | McCullough | 30/276 |
| 4,587,732 A | | 5/1986 | Lind et al. | |
| 4,637,140 A | * | 1/1987 | Bettcher | 30/276 |
| 4,637,288 A | | 1/1987 | Olsen et al. | |
| 4,756,220 A | | 7/1988 | Olsen et al. | |
| 4,791,726 A | | 12/1988 | Ailey, Jr. | |
| 4,854,046 A | * | 8/1989 | Decker et al. | 30/276 |
| 4,949,461 A | | 8/1990 | van der Merwe et al. | |
| 4,967,474 A | | 11/1990 | Wells | |
| 5,002,135 A | | 3/1991 | Pellenc | |
| 5,150,523 A | | 9/1992 | McCurry | |
| 5,172,479 A | | 12/1992 | Keeton | |

(List continued on next page.)

FOREIGN PATENT DOCUMENTS

| | | |
|---|---|---|
| DE | 1107556 | 5/1961 |
| DE | 3322912 A1 | 1/1985 |
| GB | 233981 | 5/1925 |
| WO | WO 91/14545 | 10/1991 |
| WO | WO 01/24977 A2 * | 4/2001 |

*Primary Examiner*—H. S. Payer
(74) *Attorney, Agent, or Firm*—Watts Hoffmann Co., LPA

(57) ABSTRACT

A rotary knife having an annular blade, a split blade housing for supporting the blade for rotation, a handle assembly including a head member for supporting the split blade housing, and a clamping assembly including a clamp body for clamping the split blade housing to the head member. A portion of the split blade housing is provided with an area of scoring along a bearing surface that bears against the clamp body. Similarly, the clamp body is provided with an area of scoring along a bearing surface that bears against the blade housing bearing surface. The areas of scoring coact to inhibit movement of one end of the split blade housing with respect to a second end of the split blade housing when the split blade housing is clamped to the head member.

18 Claims, 5 Drawing Sheets

U.S. PATENT DOCUMENTS

| | | | | |
|---|---|---|---|---|
| 5,263,513 A | | 11/1993 | Roe | |
| 5,341,572 A | | 8/1994 | Michelson | |
| 5,375,330 A | | 12/1994 | Herrmann | |
| 5,476,119 A | | 12/1995 | Herrmann | |
| 5,517,762 A | | 5/1996 | Kuribayashi | |
| 5,761,817 A | * | 6/1998 | Whited et al. | 30/276 |
| 5,918,371 A | | 7/1999 | Herrmann et al. | |
| 5,950,313 A | | 9/1999 | Herrmann et al. | |
| 2003/0084576 A1 | * | 5/2003 | Whited et al. | 30/276 |

* cited by examiner

POWER OPERATED ROTARY KNIFE

FIELD OF THE INVENTION

The present invention relates to a power operated rotary knife with an improved blade housing and clamping assembly.

BACKGROUND OF THE INVENTION

Power operated rotary knives have been used in commercial meat processing operations to trim fat and connective tissue from meat, trim pieces of met from bones, and to produce meat slices. Such knives are often constructed so that they are driven via a long flexible drive shaft. The knife operator wields the knife relatively freely at a meat cutting work station that is remote from the driving motor.

The blade of a power operated rotary knife must be replaced periodically. To permit easy removal of the blade from a blade housing, a split blade housing has been employed. Such a split blade housing is disclosed in published PCT Application No. PCT/US00/27488 (International Publication No. WO 01/24977 A2), assigned to the assignee of the present invention and which is incorporated herein in its entirety by reference.

A clamping assembly is used to secure the blade housing to a head member of the knife. The clamping assembly includes a clamp body and a pair of clamping screws. The pair of clamping screws extend through holes in the head member and into tapped holes in the clamp body. The clamping screws are tightened to secure the blade housing to the head member.

The blade housing includes a slot on its outer periphery to facilitate remove of the blade from the blade housing without the necessity of removing the blade housing or the clamp body from the head member. To remove the blade, the clamping screw nearest the blade housing slot is slightly loosened, a screwdriver is inserted in the slot and levered against the head member to resiliently expand the blade housing diameter and, thereby, release the blade from the blade housing. Upon installing a new blade, the screwdriver is removed from the slot and the blade housing returns to its unexpanded diameter and the clamping screw is tightened. Frictional forces between the blade housing, clamp body and head member maintain the blade housing in its unexpanded condition.

It has been found that some operators of such rotary knives fail to tighten the clamping screw sufficiently after installing a new blade. During cutting operations, forces are applied to the split housing that tend to spread it apart. If the clamping screw is not sufficiently tightened, the blade housing diameter may gradually expand during use of the knife. Expansion of the blade housing during use of the knife may result in chattering of the blade, poor cutting performance and downtime as the operator attempts to analyze and remedy the problem. To avoid this problem it would be desirable to provide an inexpensive and reliable structure to increase the frictional force between the blade housing and the clamp body that maintain the blade housing in its unexpanded condition during use of the knife but that still permits easy changing of the blade by loosening of a single clamping screw.

SUMMARY OF THE INVENTION

The present invention provides for an improved rotary knife comprising an annular blade, a split blade housing for supporting the blade for rotation, a handle assembly including a head member for supporting the split blade housing, and a clamping assembly including a clamp body for clamping the split blade housing to the head member.

An important feature of the invention is that a portion of the split blade housing is provided with an area of scoring along a bearing surface that bears against the clamp body. Similarly, the clamp body is provided with an area of scoring along a bearing surface that bears against the blade housing bearing surface. The areas of scoring coact to inhibit movement of one end of the split blade housing with respect to a second end of the split blade housing when the split blade housing is clamped to the head member. Preferably, the scoring of the clamp bearing surface of the blade housing comprises lines of scoring defining a pattern of alternating ridges and grooves and the scoring of the blade housing bearing surface of the clamp body comprises lines of scoring defining a pattern of alternating ridges and grooves. The lines of scoring of the blade housing are configured to inter fit with the lines of scoring of the clamp body, that is, the ridges of the clamp body engage the grooves of the blade housing and the ridges of the blade housing engage the grooves of the clamp body to increase the frictional force between the clamp body and the blade housing.

These and other objects, features and advantages of the invention will become better understood from the detailed description of the preferred embodiments of the invention which are described in conjunction with the accompanying drawings.

BY DESCRIPTION OF THE BEST MODE FOR PRACTICING THE INVENTION

Figure 1:
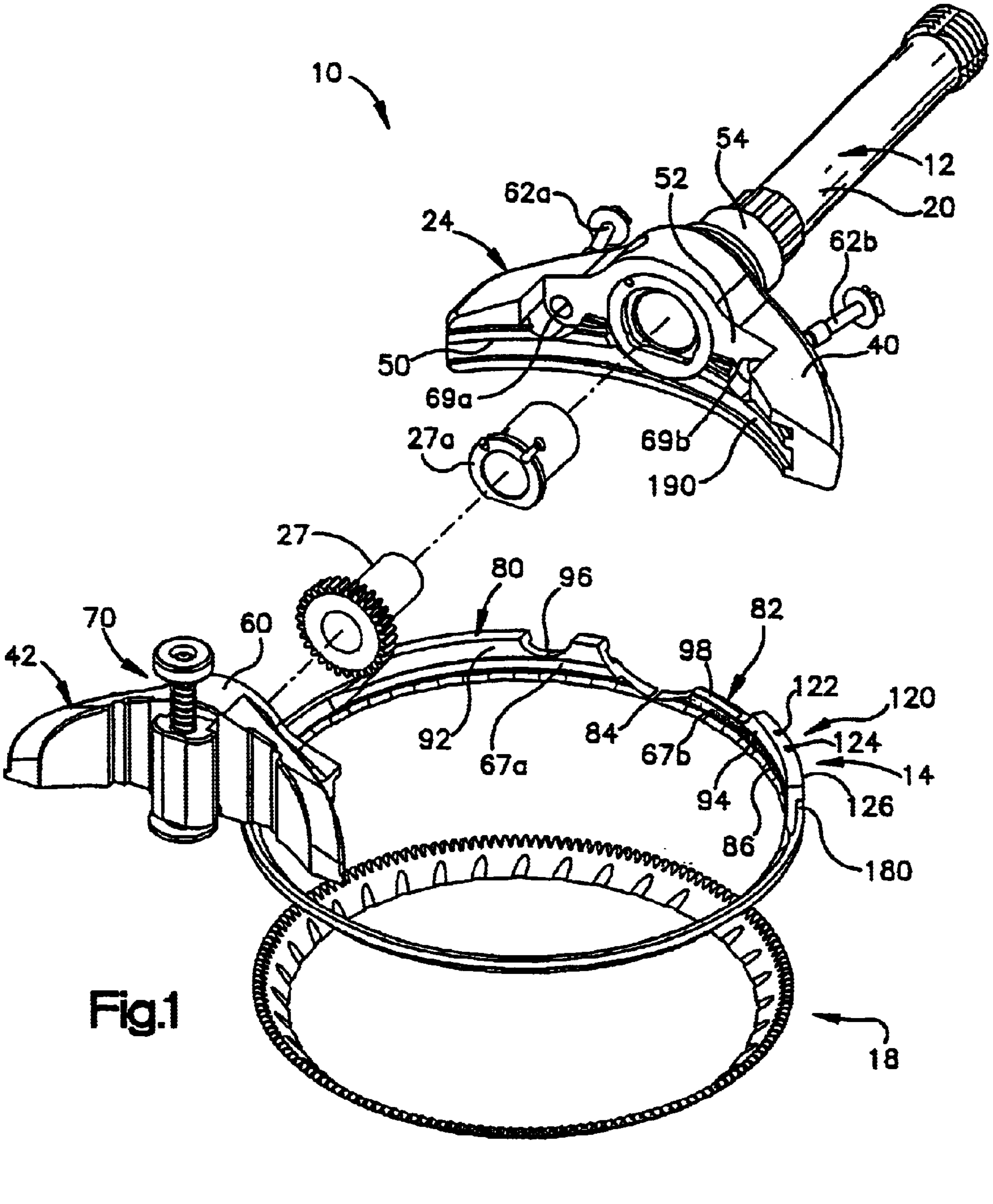
FIG. 1 is an exploded perspective view of a rotary knife of the present invention.
Figure 2:
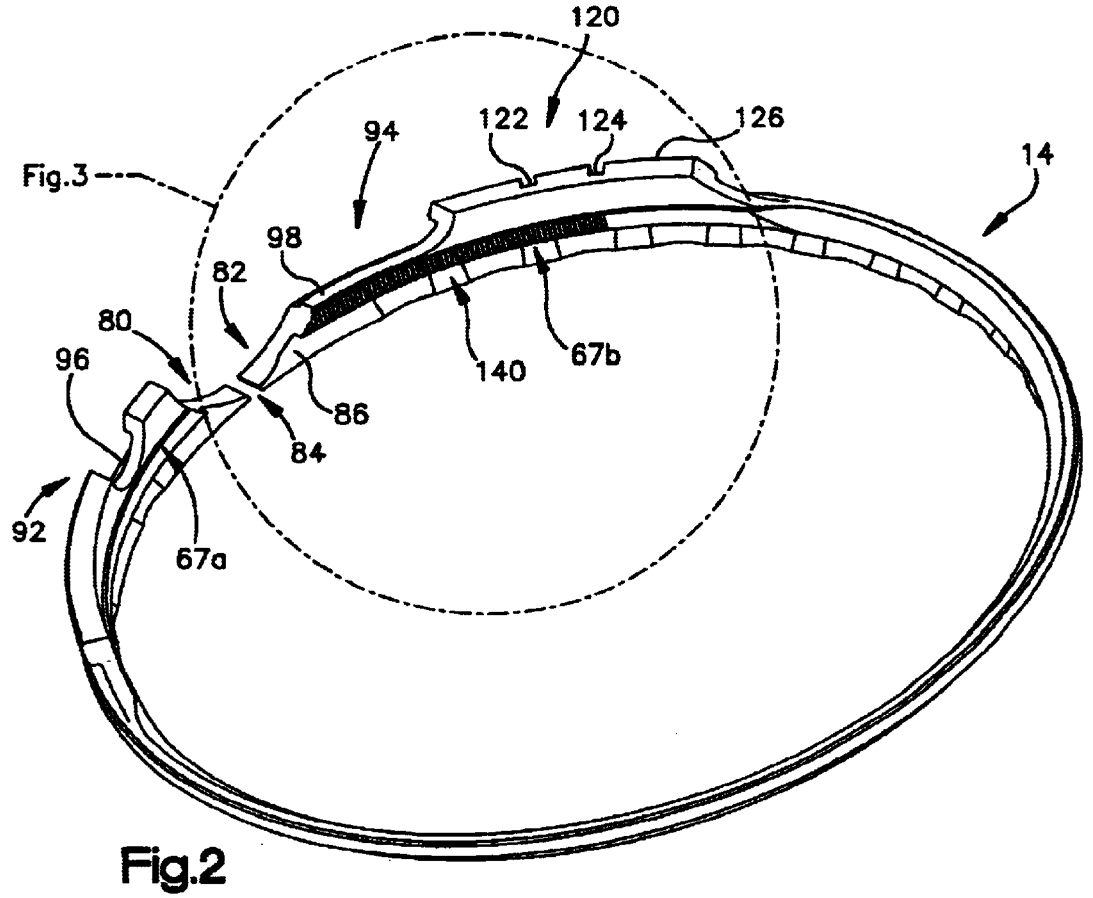
FIG. 2 is a perspective view of a split blade housing of the rotary knife of FIG. 1.
Figure 3:
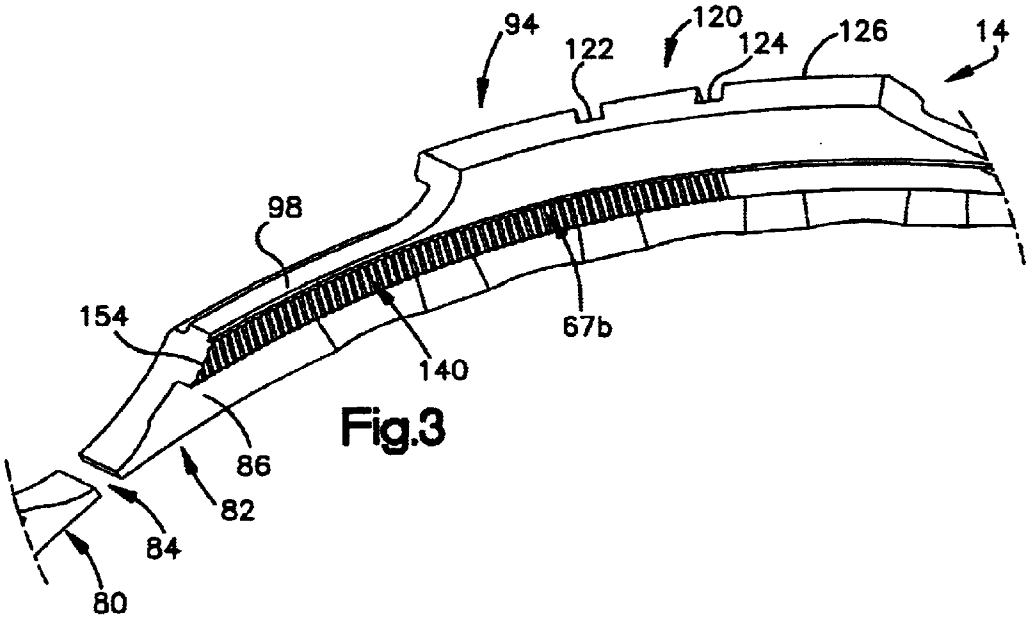
FIG. 3 is an enlarged perspective view of a portion of the split blade housing of FIG. 2.
Figure 4:
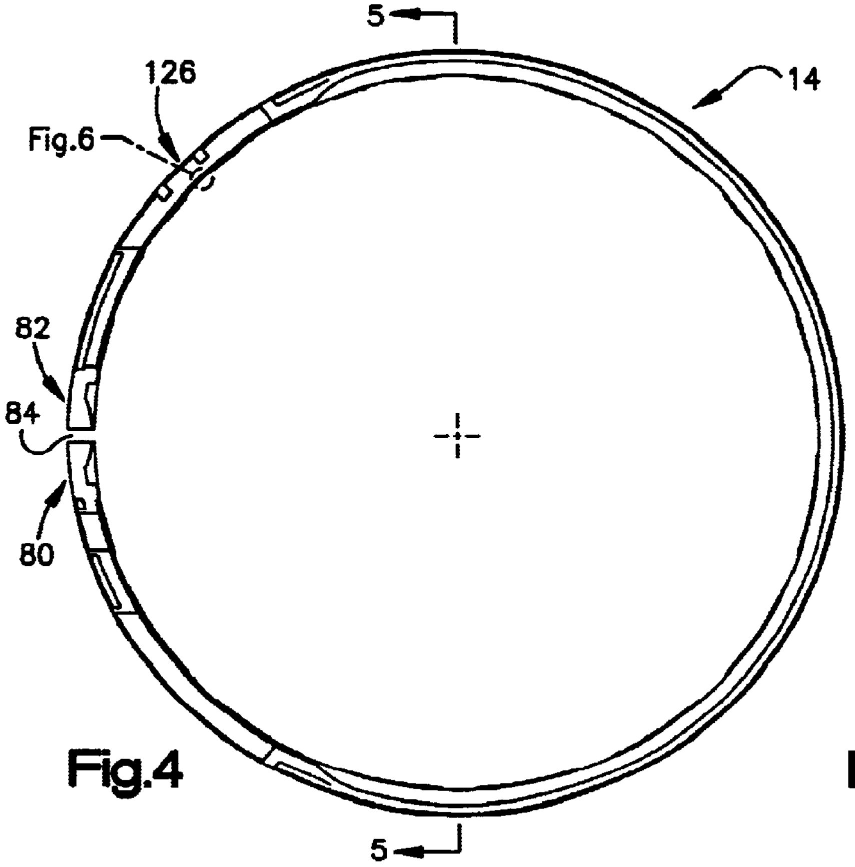
FIG. 4 is a top plan view of the split blade housing of FIG. 2.
Figure 5:
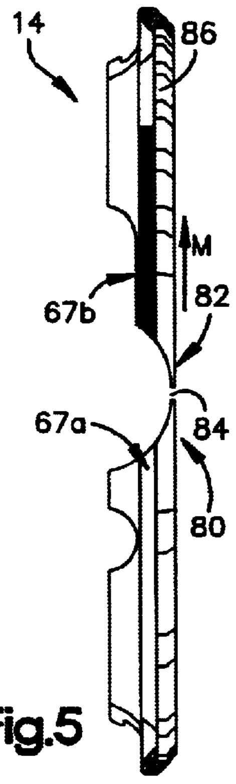
FIG. 5 is a sectional view of the split blade housing of FIG. 2 as seen from a plane indicted by the line 5—5 in FIG. 4.

A rotary knife 10 embodying the invention is illustrated in the drawings. As illustrated by FIG. 1, the knife 10 comprises a handle 12, a generally circular, split blade housing 14 supported by the handle assembly 12, and an annular blade 18 supported by the blade housing 14 for rotation about a central axis. The illustrated knife is connected to a remote electric motor by a flexible drive shaft so that the blade 18 is driven from the electric motor. The motor and drive shaft may be of any suitable or conventional construction and are not illustrated. It should be appreciated that other means may be employed to drive the blade 18. For example, an air motor may be mounted in the handle assembly 12 and connected to a source of pressurized air via a suitable hose, or an electric motor may be mounted in the handle assembly 12 and connected to a power source by a power cord.

The illustrated handle assembly 12 extends away from the blade 18 and blade housing 14 along a line that is transverse to the axis of rotation of the blade 18 allowing a knife operator to wield the knife with one hand. The handle assembly 12 comprises a handle supporting frame member 20, a head assembly 24 fixed to the frame member 20. A hand grip (not shown) surrounds frame member 20 and provides a gripping surface for an operator. The frame member 20 is adapted to receive various hand pieces having different configurations to permit an operator to select a hand grip which is most comfortable for the operator's hand.

The frame member 20 rigidly supports the head assembly 24, a blade driving pinion gear 27 and a pinion gear supporting bearing 27*a* while providing a channel through which the flex shaft (not shown) extends to make a driving connection with the pinion gear 27. The head assembly 24 secures the blade housing 14 and the blade 18 to the housing while enabling their removal and replacement when desired. The illustrated head assembly 24 comprises a head it member 40 and a clamp assembly 42 that detachably clamps the blade housing 14 and the blade 18 to the head member 40. The head assembly 24 also includes a conventional lubrication system (not shown) by which a relatively viscous, edible lubricant may be supplied to the pinion gear 27, the blade 18 and the blade housing 14 via suitable passages. An operator depresses a rubber-like diaphragm of the lubrication systems to force a flow of the lubricant into the pinion gear teeth for which the lubricant flows onto the blade 18 and is circulated about the blade housing 14. The lubrication system forms no part of the invention and is therefore not described in further detail since it may be of any conventional or suitable construction and may be omitted from the knife 10 altogether if desired.

The head member 40 positions the blade housing 14 relative to the handle assembly 12. The illustrated head member 40 is a generally crescent shaped, cast metal body that defines a semicircular blade housing seating region, a clamp assembly receiving, socket-like cavity 52, and a boss 54 that surrounds the frame member 20 and projects from the head member body opposite to the cavity 52 and seating region 50. The pinion gear bearing 27*a* is a tubular member that is fixed in the head member 40 and surrounds a shank of the pinion gear. The clamp assembly 42 includes a steeling mechanism 70 by which the blade 18 can be straightened by a knife operator. The steeling mechanism forms no part of the invention and is therefore not described in further detail since it may be of any conventional or suitable construction and may be omitted from the knife 10 altogether if desired.

Figure 7:
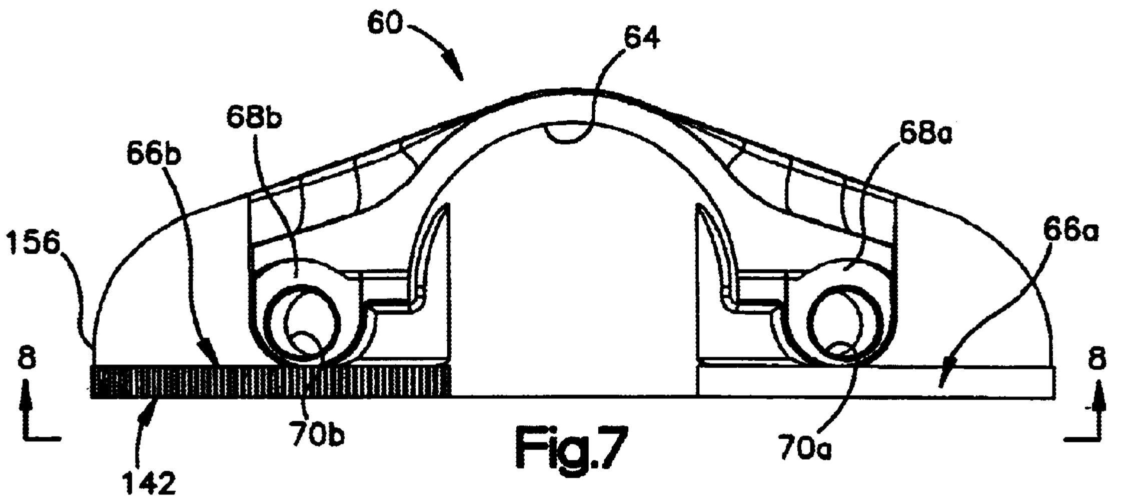
FIG. 7 is front elevation view of a clamp body of the rotary knife of FIG. 1.
Figure 8:
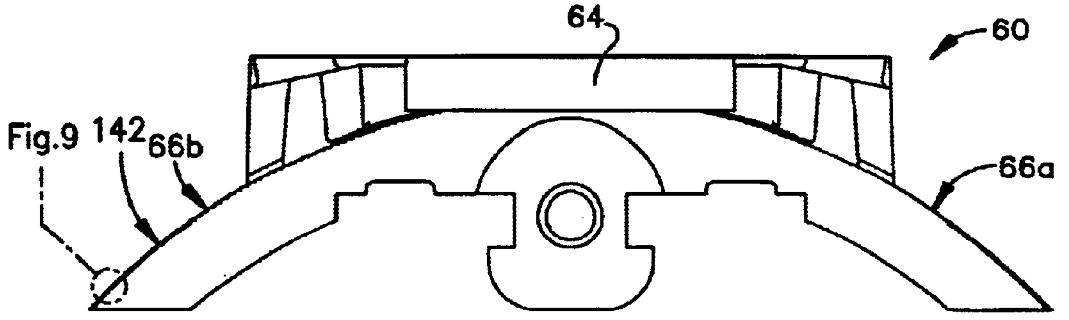
FIG. 8 is a bottom plan view of the clamp body of FIG. 7 as seen from a plane indicated by the line 8—8 in FIG. 7.

The clamp assembly 42 firmly maintains the blade housing 14 seated against the seating region 50 to rigidly position the blade 18 while covering the pinion gear 27 which might otherwise be directly exposed to meat, fat, bone chips, etc. The clamp assembly 42 comprises a clamp body 60 and clamping screws 62*a*, 62*b*. The clamp body 60 defines a semicircular recess 64 (FIGS. 7 and 8) confronting the head member 40 for receiving the pinion gear 27, outer peripheral bearing surfaces 66*a*, 66*b* (FIGS. 7 and 8) that engage the blade housing 14 along inner peripheral bearing surfaces 67*a*, 67*b* (FIGS. 1, 2, 3 and 5) on respective opposite sides of the blade housing split 84, and clamping screw receiving bosses 68*a*, 68*b* (FIG. 7) that project past the blade housing 14 into the cavity 52.

The clamping screws 62*a*, 62*b* extend through respective holes 69*a*, 69*b* in the rear side of the head member 40 and into respective tapped holes 70*a*, 70*b* (FIG. 7) in the clamp body bosses 68*a*, 68*b*. The screws 62*a*, 62*b* are tightened to clamp the clamp body 60 against the blade housing 14. Each clamp face 66*a*, 66*b* exerts force on the blade housing bearing surfaces 67*a*, 67*b* that depends on the tension in the respective clamping screws 62*a*, 62*b*. The illustrated clamping screws 62*a*, 62*b* are unscrewed from the clamp body 60 to release the clamp body 60 and the blade housing 14 from the handle assembly 12. The screws 62*a*, 62*b* and head member holes 69*a*, 69*b* are preferably constructed so that the screws 62*a*, 62*b* are captured in the holes 69*a*, 69*b* when unscrewed from the clamp body 60. This prevents the screws 62*a*, 62*b* from being misplaced when changing the blade housing 14.

Advantageously, in the knife 10 of the present invention, the blade 18 may be removed and replaced without the necessity of removing the blade housing 14. The blade housing 14 has first and second end portions 80, 82 extending circumferentially away from opposite sides of the blade housing split 84 along the handle seating region 50 and defines a radially inwardly opening circumferential groove 86 (best seen in FIG. 3) that receives the blade 18. The blade housing 14 is split to enable-resilient expansion for removing and replacing the blade 18.

The blade housing 14 is constructed and arranged so that the end portion 82 is shiftable along the handle seating region 50 relative to the end portion 80 for expanding the blade housing 14. The blade housing 14 is centered on the axis of rotation of the blade 18 with the end portions 80, 82 forming a blade housing mounting structure that extends circumferentially partially about the blade housing 14 on opposite sides of the split 84 between the head member 40 and the clamp assembly 42.

The illustrated end portions 80, 82 include axial extensions 92, 94 that are clamped between the clamp body 60 and the head member 40 and are construction for facilitating blade housing expansion for blade removal and replacement. The extension 92 defines an arcuate notch 96 through which the clamp body boss 68*a* extends. The notch 96 closely conforms to the shape of the boss 68*a*. When the clamping screw 62*a* is threaded into the boss hole 69*a*, the boss 68*a* extends through the notch 96 and prevents the blade housing end portion 80 from moving with respect to the clamp face 66*a*.

The blade housing extension 94 defines an elongated reduced height section 98 that extends away from the split 84. The boss 68*b* extends through the reduced height section 98 when the blade housing 14 is supported on the head member 40. The length of the reduced height portion 98 assures that the blade housing end portion 82 can move freely along the confronting clamp face 66*b* toward and away from the end portion 80 when the clamp screw 62*b* is completely loosened.

The blade housing 14 is formed with an expansion structure 120 that enables the housing 14 to be resiliently expanded, while still connected to the head member 40, when the blade 18 is removed and replaced. The expansion structure 120 comprises one or more, e.g., two spaced apart axial slots 122, 124 in the blade housing outer periphery 126 adjacent the head member 40. To remove the blade 18, the clamping screw 62*b* is partially, but not completely loosened, thus maintaining some tension in the clamping screw 62*b* and, therefore, some clamping force applied to the blade housing 14. A screwdriver, or equivalent tool, is inserted in the slot 124 and levered against the head member 40 to resiliently expand the blade housing diameter. The screwdriver is then removed from slot 124 and inserted in slot 122 and levered against the head member to further resiliently expand the blade housing diameter and allow for easy removal of the blade 18 from the blade housing groove 86. Because the clamping screw 62*b* is only partially loosened and some clamping force on the blade housing 14 remains, the blade housing 14 does not snap back or return to its unexpanded diameter when the screwdriver is removed from the slot 124 and inserted in slot 122. Similarly, the residual clamping force prevents the blade housing 14 from returning to its unexpanded diameter when the screw drive is removed from the slot 122. After the blade 18 is removed and replaced with a new blade, the screwdriver is used inserted in slot 122 and then slot 124 to urge the blade housing 14 back to its unexpanded diameter. The clamping screw 62*b* is then tightened to complete the blade replacement process.

It has been found that some operators fail to sufficiently tighten the clamping screw 62*b* after replacing the blade 18. If the clamping screw 62*b* is not sufficiently tightened, the clamping force applied to the blade housing 14 by the clamp body 60 may be sufficient to maintain the blade housing 14 in its unexpanded condition during operation of the knife 10. During operation of the knife 10, forces are applied to the blade housing 14 that tend to expand the diameter. The blade housing end portion 80 is prevented from moving by virtue of the intermitting of the notch 96 and the clamp body boss 68*a*. However, the blade housing end portion 82 is not similarly constrained and the blade housing end portion 82 may move with respect to the blade housing end portion 80, the clamp body 60 and the head member 40 if the blade housing 14 is subjected to enough force tending to expand its diameter, that is a force on the blade housing 14 that would tend to enlarge the size of the split 84.

When the clamping screws 62*a*, 62*b* are tightened, there are frictional forces between the clamp body bearing, surface 66*b* and the blade housing bearing surface 67*b* and between the outer periphery 180 of the blade housing end portion 82 and a corresponding bearing surface 190 of the head member seating region 50 that tend to keep the blade housing end portion 82 from moving with respect to the blade housing end portion 80. One way to increase such frictional forces is to increase the tension of the clamping screws 62*a*, 62*b*, i.e., increase the tightness of the clamping screws 62*a*, 62*b*. This has several potential problems. First, the threaded holes 70*a*, 70*b* of the clamp body 60 and the threads of the clamping screws 62*a*, 62*b* can only tolerate limited amount of tightening tension before failing. Second, tightening the clamping screws 62*a*, 62*b* requires the operator to use a screwdriver on the screws. Some operators may not be able to tighten the screws to recommended torque values. Third, even if screws 62*a*, 62*b* are checked by maintenance personnel and, if necessary, tightened to recommended torque values prior to use on a shift, an operator changing the blade 18 during the course of a day must loosen the clamping screw 62*b* to remove and replace the blade. There is no guarantee that the clamping screw 62*b* will be sufficiently tightened after blade replacement.

Advantageously, in the knife 10 of the present invention, the blade housing 14 and the clamp body 60 include structure for increasing the frictional force between the blade housing and the clamp body for any given tension or tightness of the clamping screws 68*a*, 68*b*. The structure includes an area of scoring 140 on the blade housing bearing surface 67*b* and a corresponding area of scoring 142 on the clamp body bearing surface 70*b*. As can best be seen in FIGS. 3 and 7, the scoring areas 140, 142 comprise a plurality of parallel lines of scoring, the lines oriented being perpendicular to a direction of movement M (FIG. 5) of the blade housing end portion 82.

Figure 6:
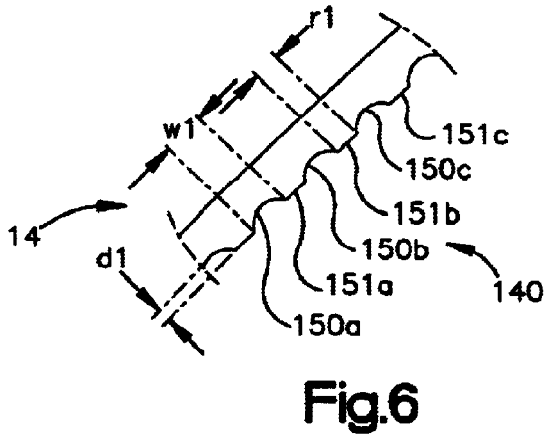
FIG. 6 is an enlarged plan view showing detail of lines of scoring of the split blade housing of FIG. 2.
Figure 9:
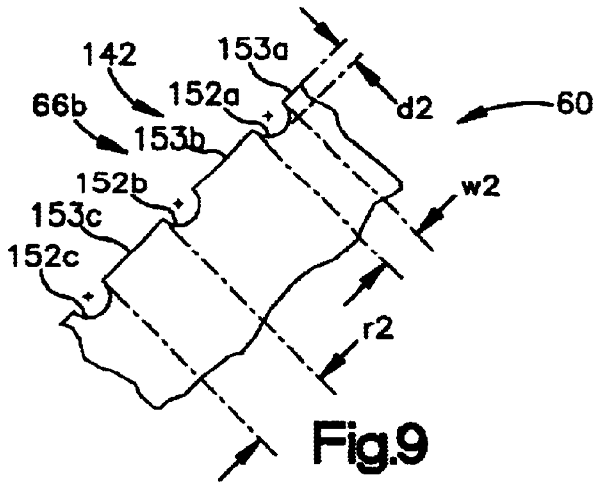
FIG. 9 is an enlarged plan view showing detail of lines of scoring of the clamp body of FIG. 7.

In one preferred embodiment, the clamp body 60 is an aluminum casting while the blade housing 14 is fabricated of stainless steel. The lines of scoring may easily be implemented by laser scoring. Desirably, the lines of the scoring in the respective scoring areas 140, 142 are sized and configured to interfit to increase frictional forces. In one preferred embodiment, the scoring 140 of the blade housing bearing surface 67*b* comprises a series of radial grooves (shown schematically as 150*a*, 150*b*, 150*c* in FIG. 6), when viewed in cross section, having a depth d1 of 0.005 inches, a width w1 of 0.020 inches and a distance r1 between adjacent grooves of 0.010 inches, while the scoring of the clamp body bearing surface 66*b* comprises a series of radial grooves (shown schematically as 152*a*, 152*b*, 152*c* in FIG. 9), when viewed in cross section, having a depth d2 of 0.005 inches, a width w2 of 0.010 inches and a distance r2 between adjacent grooves of 0.020 inches.

The areas of scoring may be viewed as an alternating pattern of grooves and ridges (distance between adjacent grooves). As can be seen from the above dimensions, the grooves 150*a*, 150*b*, 150*c* of the blade housing bearing surface 67*b* (width 0.020 inches) interfit with the ridges 153*a*, 153*b*, 153*c* of the clamp body bearing surface 66*b* (width 0.020 inches). The grooves 152*a*, 152*b*, 152*c* of the clamp body bearing surface 66*b* (width 0.010 inches) interfit with the ridges 151*a*, 151*b*, 151*c* of the blade housing bearing surface (width 0.010 inches). A longitudinal extent of the areas of scoring 140, 142 is determined by a distance between an edge of the end portion 154 (FIG. 3) where the scoring area 140 commences and the outer edge 156 (FIG. 7) of the clamp body 60. In one embodiment, the longitudinal extent of the areas of scoring 140, 142 is approximately 1⅝ inches.

Figure 10:
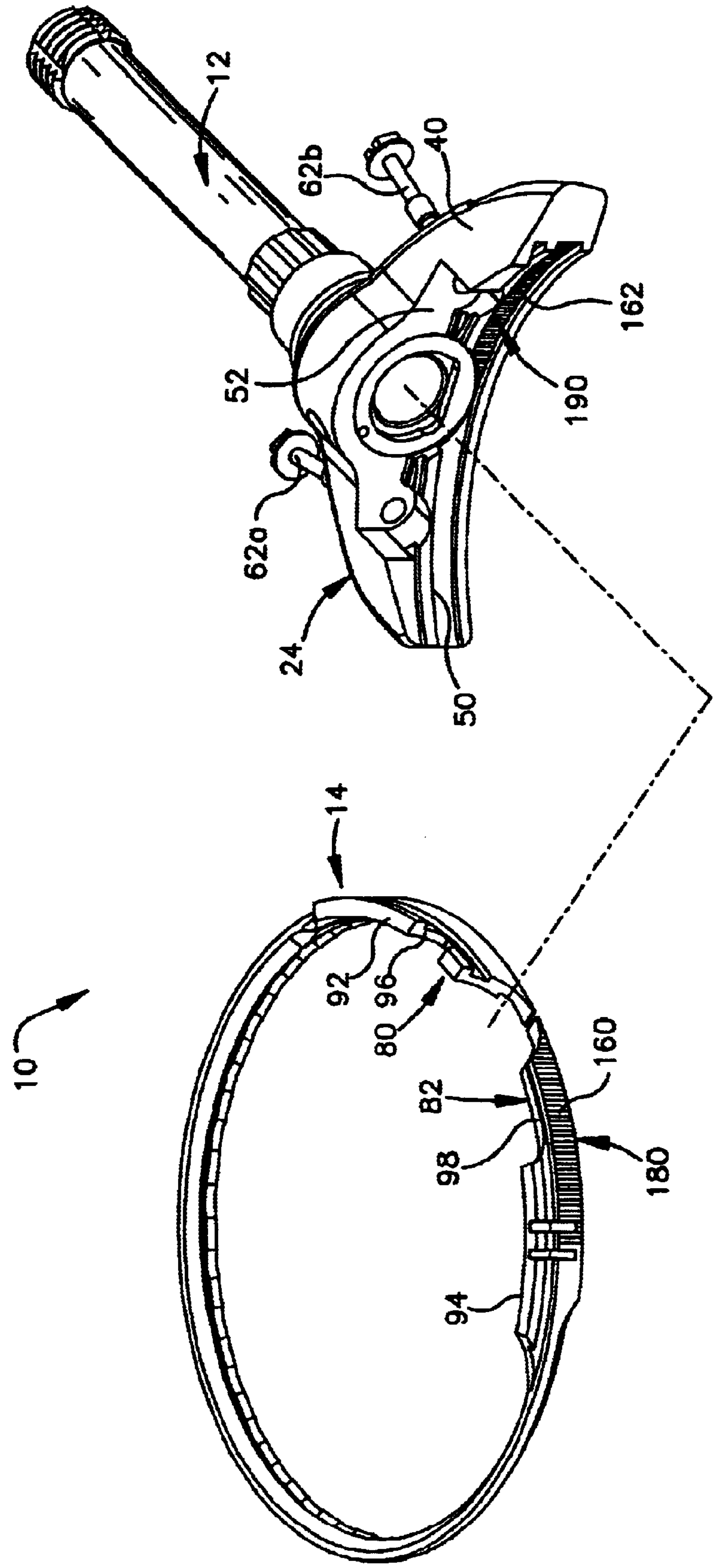
FIG. 10 is a perspective view of split blade housing and handle assembly of an alternate embodiment of the rotary knife of the present invention.

If additional frictional force resisting movement of the blade housing end portion 82 is desired, areas of scoring 140, 142 between an outer peripheral bearing surface 180 of the end portion 82 of the blade housing 14 and the corresponding bearing surface 190 of the head member 40 may be provided. This is shown as an alternate embodiment in FIG. 10. Such scoring areas 160, 162 of the outer peripheral bearing surface 180 of the blade housing 14 and the bearing surface 190 of the head member 140 respectively may be in addition to or in lieu of the areas of scoring 140, 142, shown in FIGS. 1–9.

If it is desired to use only a two areas of scoring, it is preferable to use the areas of scoring 140, 142 because it is recognized that, over long usage of the knife 10, the lines of scoring will become worn. When the lines of scoring are worn, the respective components will need to be replaced. It is more economical to replace that blade housing 14 and the clamp body 60, than to replace the blade housing 14 and the head member 40.

While the present invention has been described with a degree of particularity, it is the intent that the invention include all modifications and alterations from the disclosed embodiments falling within the spirit or scope of the appended claims.

I claim:

1. A rotary knife comprising:

a handle assembly including a handle supporting frame member and a head member extending from the handle supporting frame member;

a split blade housing for rotatably supporting an annular blade, the blade housing including first and second ends adjacent a split in the housing, a first bearing surface facing toward the blade and a second bearing surface facing away from the blade; and a clamping assembly for releasably securing the blade housing to the handle assembly head member, the clamping assembly including a clamp body that engages the first bearing surface when the blade housing is secured to the head member;

wherein the clamp body includes a bearing surface that engages the first bearing surface of the blade housing and the head member includes a bearing surface that engages the second bearing surface of the blade housing, and further wherein at least one of the clamp body bearing surface, the first and second bearing surfaces of the blade housing and the bearing surface of the head member includes an area of scoring to inhibit movement of the first end of the blade housing relative to the second end when the clamping assembly secures the blade housing to the head member.

2. The rotary knife of claim 1 wherein the blade housing first and second bearing surfaces are adjacent the first end of the blade housing.

3. The rotary knife of claim 1 wherein the clamp body bearing surface and the first bearing surface of the blade housing include areas of scoring to inhibit movement of the first end of the blade housing with respect to the second end when the clamping assembly secures the blade housing to the head member.

4. The rotary knife of claim 3 wherein the areas of scoring of the clamp body bearing surface and the first bearing surface of the blade housing comprise a plurality of parallel lines of scoring.

5. The rotary knife of claim 4 wherein the plurality of parallel lines of scoring of the clamp body bearing surface comprise a pattern of grooves and ridges and the plurality of parallel lines of scoring of the first bearing surface of the blade housing comprise a pattern of grooves and ridges.

6. The rotary knife of claim 5 wherein the pattern of grooves and ridges of the clamp body bearing surface and the pattern of grooves and ridges of the first bearing surface of the blade housing are configured to interfit such that the ridges of the clamp body bearing surface are received by the grooves of the first bearing surface of the blade housing and the ridges of the first bearing surface of the blade housing are received by the grooves of the clamp body bearing surface.

7. The rotary knife of claim 1 wherein the at least one area of scoring is formed by scoring with a laser beam.

8. The rotary knife of claim 1 wherein the head member bearing surface and the second bearing surface of the blade housing include areas of scoring to inhibit movement of the first end of the blade housing relative to the second end.

9. The rotary knife of claim 8 wherein the areas of scoring of the head member bearing surface and the second bearing surface of the blade housing comprise a plurality of parallel lines of scoring.

10. The rotary knife of claim 9 wherein the plurality of parallel lines of scoring of the head member bearing surface comprise a pattern of grooves and ridges and the plurality of parallel lines of scoring of the second bearing surface of the blade housing comprise a pattern of grooves and ridges.

11. The rotary knife of claim 10 wherein the pattern of grooves and ridges of the head member bearing surface and the pattern of grooves and ridges of the second bearing surface of the blade housing are configured to interfit such that the ridges of the head member bearing surface are received by the grooves of the second bearing surface of the blade housing and the ridges of the second bearing surface of the blade housing are received by the grooves of the head member bearing surface.

12. A split blade housing for a rotary knife having a handle assembly including a handle supporting frame member and a head member extending from the handle supporting frame member and a clamping assembly for releasably securing the blade housing to the handle assembly head member, the split blade housing comprising:

an arcuate body for rotatably supporting an annular blade;

first and second ends bounding a split in the housing; and a first bearing surface facing toward the blade adapted to be engaged by the clamping assembly to secure the blade housing to the head member and a second bearing surface facing away from the blade adapted to engage the head member;

wherein at least one of the first and second bearing surfaces of the blade housing and the bearing surface of the head member including an area of scoring to inhibit movement of the first end of the blade housing relative to the second end when the clamping assembly secures the blade housing to the head member.

13. The blade housing of claim 12 wherein the at least one area of scoring is formed by scoring with a laser beam.

14. The blade housing of claim 13 wherein the plurality of parallel lines of scoring of the first bearing surface comprise a pattern of grooves and ridges.

15. The blade housing of claim 12 wherein the first bearing surface of the blade housing includes an area of scoring comprising a plurality of parallel lines of scoring.

16. The blade housing of claim 12 wherein the second bearing surface of the blade housing includes an area of scoring comprising a plurality of parallel lines of scoring.

17. The blade housing of claim 16 wherein the plurality of parallel lines of scoring of the second bearing surface comprise a pattern of grooves and ridges.

18. The blade housing of claim 12 wherein the blade housing first and second bearing surfaces are adjacent the first end of the blade housing.

* * * * *